(12) United States Patent
Chapuis

(10) Patent No.: US 7,023,190 B2
(45) Date of Patent: *Apr. 4, 2006

(54) ADC TRANSFER FUNCTION PROVIDING IMPROVED DYNAMIC REGULATION IN A SWITCHED MODE POWER SUPPLY

(75) Inventor: Alain Chapuis, Morgan Hill, CA (US)

(73) Assignee: Power-One, Inc., Camarillo, CA (US)

( * ) Notice: Subject to any disclaimer, the term of this patent is extended or adjusted under 35 U.S.C. 154(b) by 50 days.

This patent is subject to a terminal disclaimer.

(21) Appl. No.: 10/779,475

(22) Filed: Feb. 12, 2004

(65) Prior Publication Data

US 2004/0196014 A1 Oct. 7, 2004

Related U.S. Application Data

(63) Continuation-in-part of application No. 10/361,667, filed on Feb. 10, 2003.

(51) Int. Cl.
*G05F 1/40* (2006.01)
(52) U.S. Cl. ......................... 323/282; 363/65
(58) Field of Classification Search ........ 323/282–285, 323/266, 222, 271, 272; 363/97, 40, 41, 363/20, 21.4, 17, 131; 330/207, 10, 251; 327/243, 316
See application file for complete search history.

(56) References Cited

U.S. PATENT DOCUMENTS 3,660,672 A    5/1972 Berger et al.

(Continued)

FOREIGN PATENT DOCUMENTS

EP    0660487    6/1995

(Continued)

OTHER PUBLICATIONS

33702 Microprocessor Power Supply (3.0A) Analog Products MC33702 Fact Sheet; Motorola/Digital dna/ Power Management Switching; pp 1-4.

(Continued)

*Primary Examiner*—Rajnikant B. Patel
(74) *Attorney, Agent, or Firm*—O'Melveny & Myers LLP

(57) ABSTRACT

A power supply comprises at least one power switch adapted to convey power between input and output terminals of the power supply, and a digital controller adapted to control operation of the at least one power switch responsive to an output measurement of the power supply. The digital controller comprises an analog-to-digital converter providing a digital error signal representing a voltage difference between the output measurement and a reference value, a digital filter providing a digital control output based on a sum of previous error signals and previous control outputs, an error controller adapted to modify operation of the digital filter upon an error condition, and a digital pulse width modulator providing a control signal to the power switch having a pulse width corresponding to the digital control output. The analog-to-digital converter further comprises a windowed flash analog-to-digital converter having a transfer function defining a relationship between the voltage difference and corresponding digital values. The transfer function provides a substantially linear region at a center of a corresponding error window, including a first step size in the center of the error window and at least one other step size in a peripheral region of the error window that is larger than the first step size. The first step size and the other step sizes may each reflect a linear relationship between the voltage difference and the corresponding digital values. Alternatively, the first step size reflects a linear relationship between the voltage difference and the corresponding digital values, and the other step sizes each reflect a non-linear relationship between the voltage difference and the corresponding digital values.

25 Claims, 3 Drawing Sheets

U.S. PATENT DOCUMENTS

| | | | |
|---|---|---|---|
| 4,194,147 A | 3/1980 | Payne et al. | |
| 4,538,073 A | 8/1985 | Freige et al. | |
| 4,538,101 A | 8/1985 | Shimpo et al. | |
| 4,616,142 A | 10/1986 | Upadhyay et al. | |
| 4,622,627 A | 11/1986 | Rodriguez et al. | |
| 4,654,769 A | 3/1987 | Middlebrook | |
| 5,053,920 A | 10/1991 | Staffiere et al. | |
| 5,073,848 A | 12/1991 | Steigerwald et al. | |
| 5,079,498 A * | 1/1992 | Cleasby et al. | 323/283 |
| 5,229,699 A * | 7/1993 | Chu et al. | 318/610 |
| 5,349,523 A | 9/1994 | Inou et al. | |
| 5,377,090 A | 12/1994 | Steigerwald | |
| 5,481,140 A | 1/1996 | Maruyama et al. | |
| 5,532,577 A | 7/1996 | Doluca | |
| 5,627,460 A | 5/1997 | Bazinet et al. | |
| 5,727,208 A | 3/1998 | Brown | |
| 5,752,047 A | 5/1998 | Darty et al. | |
| 5,815,018 A | 9/1998 | Soborski | |
| 5,883,797 A | 3/1999 | Amaro et al. | |
| 5,892,933 A | 4/1999 | Voltz | |
| 5,905,370 A | 5/1999 | Bryson | |
| 5,917,719 A | 6/1999 | Hoffman et al. | |
| 5,929,618 A | 7/1999 | Boylan et al. | |
| 5,943,227 A | 8/1999 | Bryson et al. | |
| 5,946,495 A | 8/1999 | Scholhamer et al. | |
| 5,990,669 A | 11/1999 | Brown | |
| 6,057,607 A | 5/2000 | Rader, III et al. | |
| 6,115,441 A | 9/2000 | Douglass et al. | |
| 6,157,182 A | 12/2000 | Tanaka et al. | |
| 6,163,143 A * | 12/2000 | Shimamori | 323/284 |
| 6,163,178 A | 12/2000 | Stark et al. | |
| 6,191,566 B1 | 2/2001 | Petricek et al. | |
| 6,194,883 B1 | 2/2001 | Shimamori | |
| 6,208,127 B1 | 3/2001 | Doluca | |
| 6,211,579 B1 | 4/2001 | Blair | |
| 6,262,900 B1 | 7/2001 | Suntio | |
| 6,385,024 B1 | 5/2002 | Olson | |
| 6,392,577 B1 | 5/2002 | Swanson et al. | |
| 6,396,169 B1 | 5/2002 | Voegli et al. | |
| 6,396,250 B1 | 5/2002 | Bridge | |
| 6,421,259 B1 | 7/2002 | Brooks et al. | |
| 6,429,630 B1 | 8/2002 | Pohlman et al. | |
| 6,683,494 B1 * | 1/2004 | Stanley | 330/10 |
| 6,829,547 B1 | 12/2004 | Law et al. | |
| 2002/0105227 A1 | 8/2002 | Nerone et al. | |
| 2004/0090219 A1 | 5/2004 | Chapuis | |
| 2004/0093533 A1 | 5/2004 | Chapuis et al. | |
| 2004/0123164 A1 | 6/2004 | Chapuis et al. | |
| 2004/0123167 A1 | 6/2004 | Chapuis | |
| 2004/0135560 A1 | 7/2004 | Kernahan et al. | |
| 2004/0155640 A1 | 8/2004 | Sutardja et al. | |
| 2004/0178780 A1 | 9/2004 | Chapuis | |
| 2004/0246754 A1 | 12/2004 | Chapuis | |
| 2005/0093594 A1 | 5/2005 | Kim et al. | |

FOREIGN PATENT DOCUMENTS

| | | |
|---|---|---|
| EP | 0875994 | 11/1998 |
| EP | 0997825 | 5/2000 |
| GB | WO93/19415 | 9/1993 |
| RU | 1814177 | 5/1993 |
| WO | WO02/31951 | 4/2002 |
| WO | WO02/50690 | 6/2002 |

OTHER PUBLICATIONS

"Motorola Switch Mode Power Supply With Multiple Linear Regulators And High Speed CAN Transceiver" Motorola, Inc. 2002; digital dna; Analog Marketing; Rev. 2.5, Nov. 2002; 33394; Multi-Output Power Supply Semiconductor Technical Data.

"Power Management Solutions For Networking Applications"; Presented by Luc Darmon Smart Networks Developer Forum 2003—Jun. 4-6 Euro-Disney Paris, France; Motorola digital dna; www.motorola.com/sndf; pp. 1-26.

Preliminary Information 1.5 A Switch-Mode Power Supply With Linear Regulator 33701; Power Supply Integrated Circuit; Motorola Semiconductor Technical Data; Analog Marketing MC33701/D Rev. 1.0, May 2003; Motorola digital dna; pp. 1-24.

"The 1 2-C Bus Specification" Version 2.1; Jan. 2000; document order No.; 9398 393 40011; Phillips Semiconductors; pp. 1-46.

"System Management Bus Specification" Smart Battery System Specification; Revision 1.1 Dec. 11, 1998; SBS Implementers Forum; Version 1.1; pp. 1-39.

"KEKB Power Supply Interface Controller Module" by A. Akiyama, T. Nakamura, M. Yoshida, T. Kubo, N. Yamamoto and T. Katoh KEK, High Energy Accelerator Research Organization, 1-1 Ohio, Tsukuba 305, Japan.

"Magnet Power Supply Control System KEKB Accelerators" by T.T. Nakamura, A. Akiyama, T. Katoh, Ta. Kubo, N. Yamamoto, M. Yoshida, KEK, Tsukuba, Japan International Conference On Accelerator And Large Experimental Physics Control Systems, 1999, Trieste, Italy, pp. 406-408.

"Electronics Products" by Paul Birman and Sarkis Nercessian, Kepco, Inc. Flushing NY vol. 37, No .10, Electronic Products, Mar. 1995; The Engineer's Magazine of Product Technology; Power Supply Special, DSO Samples Single Shots at 10 Gsamples/s Speech Recognition On A Single Chip LCD Has Flat-Panel Benefits At CRT Cost Product Update: High-Performance OP AMPS; A Hearst Business Publication; pp. 1, 5, 33-34.

"Quantization Resolution and Limit Cycling in Digitally Controlled PWM Converters" by Angel V. Peterchev and A.V. Sanders Electrical Engineering and Computer Science; US Berkley; Power Electronics Specialists Conference, 2001.PESC, vol. 2, Jun. 17-21, 2001, pp. 465-471; XP002274573.

* cited by examiner

US 7,023,190 B2

ADC TRANSFER FUNCTION PROVIDING IMPROVED DYNAMIC REGULATION IN A SWITCHED MODE POWER SUPPLY

RELATED APPLICATION DATA

This application is a continuation-in-part of co-pending application Ser. No. 10/361,667, filed Feb. 10, 2003, for DIGITAL CONTROL SYSTEM AND METHOD FOR SWITCHED MODE POWER SUPPLY. This application also relates to co-pending application Ser. No. 10/361,452, filed Feb. 10, 2003, for DIGITAL SIGNAL PROCESSOR ARCHITECTURE OPTIMIZED FOR CONTROLLING SWITCHED MODE POWER SUPPLY, filed concurrently herewith, the subject matter of which is incorporated by reference herein.

BACKGROUND OF THE INVENTION

1. Field of the Invention

The present invention relates to power supply circuits, and more particularly to digital control systems and methods for switched mode power supply circuits.

2. Description of Related Art

Switched mode power supplies are known in the art to convert an available direct current (DC) or alternating current (AC) level voltage to another DC level voltage. A buck converter is one particular type of switched mode power supply that provides a regulated DC output voltage to a load by selectively storing energy in an output inductor coupled to the load by switching the flow of current into the output inductor. It includes two power switches that are typically provided by MOSFET transistors. A filter capacitor coupled in parallel with the load reduces ripple of the output current. A pulse width modulation (PWM) control circuit is used to control the gating of the power switches in an alternating manner to control the flow of current in the output inductor. The PWM control circuit uses signals communicated via a feedback loop reflecting the output voltage and/or current level to adjust the duty cycle applied to the power switches in response to changing load conditions.

Conventional PWM control circuits are constructed using analog circuit components, such as operational amplifiers, comparators and passive components like resistors and capacitors for loop compensation, and some digital circuit components like logic gates and flip-flops. But, it is desirable to use entirely digital circuitry instead of the analog circuit components since digital circuitry takes up less physical space, draws less power, and allows the implementation of programmability features or adaptive control techniques. A conventional digital control circuit includes an analog-to-digital converter (ADC) that converts an error signal representing the difference between a signal to be controlled (e.g., output voltage ($V_o$)) and a reference into a digital signal having n bits. The digital control circuit uses the digital error signal to control a digital pulse width modulator, which provides control signals to the power switches having a duty cycle such that the output value of the power supply tracks the reference. In order to keep the complexity of the PWM control circuit low, it is desirable to hold the number of bits of the digital signal to a small number. At the same time, however, the number of bits of the digital signal needs to be sufficiently high to provide resolution good enough to secure precise control of the output value. Moreover, the ADC needs to be very fast to respond to changing load conditions. Current microprocessors exhibit supply current slew rates of up to 20 A/µs, and future microprocessors are expected to reach slew rates greater than 350 A/µs, thereby demanding extremely fast response by the power supply.

Single stage (i.e., flash) ADC topologies are utilized in power supply control circuit applications since they have very low latency (i.e., overall delay between input and output for a particular sample). If a standard flash ADC device is used to quantize the full range of regulator output voltage with desired resolution (e.g., 5 mV), the device will necessarily require a large number of comparators that will dissipate an undesirable amount of power. Under normal operation, the output voltage $V_o$ of the regulator remains within a small window, which means that the ADC need not have a high resolution over the entire range. Accordingly, a "windowed" ADC topology permits high resolution over a relatively small voltage range tracked by a reference voltage ($V_{ref}$). Since the quantization window tracks the reference voltage $V_{ref}$, the signal produced by the ADC will be the voltage error signal. Thus, the windowed ADC provides the dual functions of the ADC and error amplifier, resulting in a further reduction of components and associated power dissipation.

Notwithstanding these advantages, a drawback with the windowed ADC topology is that the device can go into saturation due to transient load conditions that cause the window ranges to be exceeded. By way of example, a 4-bit windowed ADC has a least significant bit (LSB) resolution of roughly 5 mV. This means that an output voltage error of as low as ±40 mV pushes the ADC into saturation. The ADC would then continue to reflect the same error signal (i.e., maximum) even though the actual error could grow even larger, referred to as a "windup" condition of the digital control system. The reaction of the feedback loop in this windup condition can be difficult to predict, since without accurate information about the error size the digital control system no longer functions as a linear system. This behavior can be particularly harmful, since it can damage the load due to overcurrent and/or overvoltage, and can also damage the power supply itself.

Thus, it would be advantageous to provide a system and method for digitally controlling a switched mode power supply that overcomes these and other drawbacks of the prior art. More specifically, it would be advantageous to provide a system and method for digitally controlling a switched mode power supply having a windowed ADC topology that can maintain accurate voltage regulation during ADC saturation caused by transient load conditions.

SUMMARY OF THE INVENTION

The present invention provides a switched mode power supply having a digital control system. More particularly, the power supply comprises at least one power switch adapted to convey power between input and output terminals of the power supply, and a digital controller adapted to control operation of the at least one power switch responsive to an output measurement of the power supply.

The digital controller comprises an analog-to-digital converter providing a digital error signal representing a voltage difference between the output measurement and a reference value, a digital filter providing a digital control output based on a sum of previous error signals and previous control outputs, an error controller adapted to modify operation of the digital filter upon an error condition, and a digital pulse width modulator providing a control signal to the power switch having a pulse width corresponding to the digital control output. The analog-to-digital converter further comprises a windowed flash analog-to-digital converter having a transfer function defining a relationship between the voltage difference and corresponding digital values. The transfer function provides a substantially linear region at a center of a corresponding error window.

In an embodiment of the invention, the transfer function of the analog-to-digital converter further comprises a first step size in the center of the error window and at least one other step size in a peripheral region of the error window that is larger than the first step size. The first step size and the other step sizes may each reflect a linear relationship between the voltage difference and the corresponding digital values. Alternatively, the first step size may reflect a linear relationship between the voltage difference and the corresponding digital values, and the other step sizes may each reflect a non-linear relationship between the voltage difference and the corresponding digital values.

In another embodiment of the invention, a method is provided for controlling a power supply having at least one power switch adapted to convey power between input and output terminals of the power supply. The method comprises the steps of receiving an output measurement of the power supply, sampling the output measurement to provide a digital error signal corresponding to a voltage difference between the output measurement and a reference value in accordance with a transfer function defining a relationship between the voltage difference and corresponding digital values, the transfer function having a substantially linear region at a center of a corresponding error window, filtering the digital error signal to provide a digital control output based on a sum of previous error signals and previous control outputs, and providing a control signal to the at least one power switch, the control signal having a pulse width corresponding to the digital control output. The transfer function may further comprise a first step size in the center of the error window and at least one other step size in a peripheral region of the error window, with the other step sizes each being larger than the first step size. The first step size and the other step sizes may each have a linear relationship between the voltage difference and the corresponding digital values. Alternatively, the first step size may reflect a linear relationship between the voltage difference and the corresponding digital values, and the other step sizes may each reflect a non-linear relationship between the voltage difference and the corresponding digital values.

A more complete understanding of the system and method for digitally controlling a switched mode power supply having an ADC transfer function selected to provide improved dynamic range will be afforded to those skilled in the art, as well as a realization of additional advantages and objects thereof, by a consideration of the following detailed description of the preferred embodiment. Reference will be made to the appended sheets of drawings, which will first be described briefly.

DETAILED DESCRIPTION OF THE PREFERRED EMBODIMENT

The present invention provides a method for digitally controlling a switched mode power supply. More specifically, the invention provides a method for digitally controlling a switched mode power supply having a windowed ADC topology that maintains accurate regulation during ADC saturation caused by transient load conditions. In the detailed description that follows, like element numerals are used to describe like elements illustrated in one or more figures.

Figure 1:
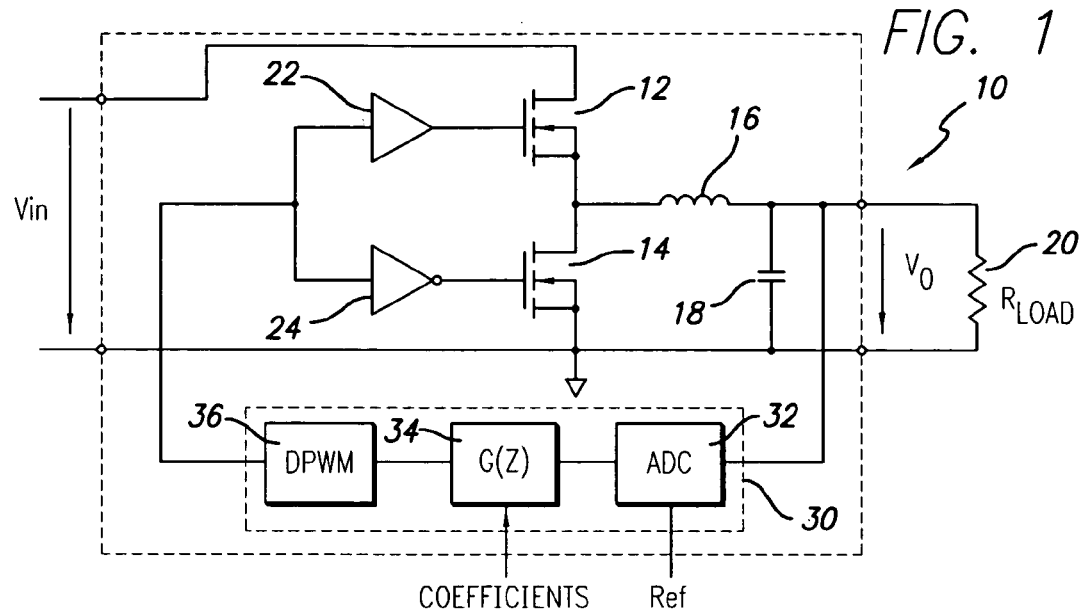
FIG. 1 depicts a switched mode power supply having a digital control circuit.

FIG. 1 depicts an exemplary switched mode power supply 10 having a digital control circuit in accordance with an embodiment of the present invention. The power supply 10 comprises a buck converter topology to convert an input DC voltage $V_{in}$ to an output DC voltage $V_o$ applied to a resistive load 20 ($R_{load}$). The power supply 10 includes a pair of power switches 12, 14 provided by MOSFET devices. The source terminal of the high side power switch 12 is coupled to the input voltage $V_{in}$, the source terminal of the low side power switch 14 is connected to ground, and the drain terminals of the power switches 12, 14 are coupled together to define a phase node. An output inductor 16 is coupled in series between the phase node and the terminal providing the output voltage $V_o$, and a capacitor 18 is coupled in parallel with the resistive load $R_{load}$. Respective drivers 22, 24 alternatingly drive the gate terminals of the power switches 12, 14. In turn, the drivers 22, 24 are controlled by digital control circuit 30 (described below). The opening and closing of the power switches 12, 14 provides an intermediate voltage having a generally rectangular waveform at the phase node, and the filter formed by the output inductor 16 and capacitor 18 converts the rectangular waveform into a substantially DC output voltage $V_o$.

The digital control circuit 30 receives a feedback signal from the output portion of the power supply 10. As shown in FIG. 1, the feedback signal corresponds to the output voltage $V_o$, though it should be appreciated that the feedback signal could alternatively (or additionally) correspond to the output current drawn by the resistive load $R_{load}$ or any other signal representing a parameter to be controlled by the digital control circuit 30. The feedback path may further include a voltage divider (not shown) to reduce the detected output voltage $V_o$ to a representative voltage level. The digital control circuit 30 provides a pulse width modulated waveform having a duty cycle controlled to regulate the output voltage $V_o$ (or output current) at a desired level. Even though the exemplary power supply 10 is illustrated as having a buck converter topology, it should be understood that the use of feedback loop control of the power supply 10 using the digital control circuit 30 is equally applicable to other known power supply topologies, such as boost and buck-boost converters in both isolated and non-isolated configurations, and to different control strategies known as voltage mode, current mode, charge mode and/or average current mode controllers.

More particularly, the digital control circuit 30 includes analog-to-digital converter (ADC) 32, digital controller 34, and digital pulse width modulator (DPWM) 36. The ADC 32 further comprises a windowed flash ADC that receives as inputs the feedback signal (i.e., output voltage $V_o$) and a voltage reference (Ref) and produces a digital voltage error signal ($VEd_k$) representing the difference between the inputs (Ref–$V_o$). The digital controller 34 has a transfer function G(z) that transforms the voltage error signal $VEd_k$ to a digital output provided to the DPWM 36, which converts the signal into a waveform having a proportional pulse width ($PWM_k$). As discussed above, the pulse-modulated waveform $PWM_k$ produced by the DPWM 36 is coupled to the gate terminals of the power switches 12, 14 through the respective drivers 22, 24.

Figure 2:
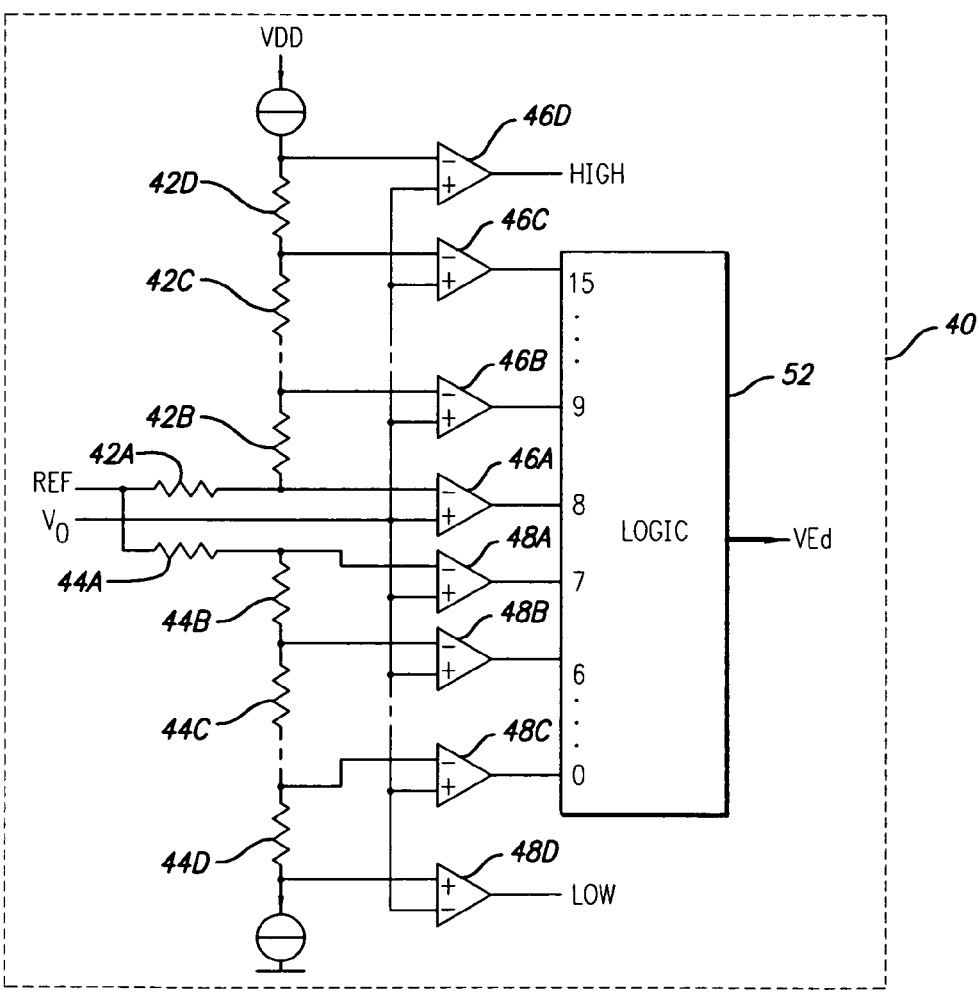
FIG. 2 depicts a windowed flash ADC that provides high and low saturation signals.

FIG. 2 depicts an exemplary windowed flash ADC 40 for use in the digital control circuit 30. The ADC 40 receives as inputs the voltage reference Ref and the output voltage $V_o$. The voltage reference is applied to the center of a resistor ladder that includes resistors 42A, 42B, 42C, 42D connected in series between the reference voltage terminal and a current source connected to a positive supply voltage ($V_{DD}$), and resistors 44A, 44B, 44C, 44D connected in series between the reference voltage terminal and a current source connected to ground. The resistors each have corresponding resistance values to define together with the current sources a plurality of voltage increments ranging above and below the voltage reference Ref. The magnitude of the resistance values and/or current sources can be selected to define the LSB resolution of the ADC 40. An array of comparators is connected to the resistor ladder, including a plurality of positive side comparators 46A, 46B, 46C, 46D and a plurality of negative side comparators 48A, 48B, 48C, 48D. The positive side comparators 46A, 46B, 46C, 46D each have a non-inverting input terminal connected to the output voltage $V_o$, and an inverting input terminal connected to respective ones of the resistors 42A, 42B, 42C, 42D. Likewise, the negative side comparators 48A, 48B, 48C each have a non-inverting input terminal connected to the output voltage $V_o$, and an inverting input terminal connected to respective ones of the resistors 44A, 44B, 44C, 44D. Negative side comparator 48D has a non-inverting input terminal connected to ground and the inverting input terminal connected to the output voltage $V_o$. It should be appreciated that a greater number of resistors and comparators may be included to increase the number of voltage increments and hence the range of the ADC 40, and that a limited number of resistors and comparators is shown in FIG. 2 for exemplary purposes only.

The ADC 40 further includes a logic device 52 coupled to output terminals of comparators 46A, 46B, 46C and 48A, 48B, 48C. The logic device 52 receives the comparator outputs and provides a multi-bit (e.g., 4-bit) parallel output representing the digital voltage error $VEd_k$. By way of example, an output voltage $V_o$ that exceeds the reference voltage Ref by one and a half voltage increments would cause the outputs of comparators 46B, 46A, 48A, 48B, and 48C to go high, while the outputs of comparators 46C, 46D and 48D remain low. The logic device 52 would interpret this as logic level 9 (or binary 1001) and produce an associated voltage error signal $VEd_k$. It should be understood that the voltage reference Ref is variable so as to shift the window of the ADC 40. If the output voltage $V_o$ exceeds the highest voltage increment of the resistor ladder, the output terminal of comparator 46D provides a HIGH saturation signal. Similarly, if the output voltage $V_o$ is lower than the lowest voltage increment of the resistor ladder, the output terminal of comparator 48D provides a LOW saturation signal.

In a conventional windowed flash ADC, the resistors 44A, 44B, 44C, 44D have equal values so as to define a plurality of n voltage references equally spaced above and below the reference voltage Ref. The n comparators 46A, 46B, 46C and 48A, 48B, 48C compare the actual output voltage $V_O$ against the n voltage references and generate a corresponding "thermometer" code, such that comparators 0 to X have an output of one and comparators X+1 to n have an output of zero, with X depending on the voltage amplitude of the $V_o$ signal.

It should be appreciated that the range that the windowed flash ADC 40 is able to convert into a digital signal is limited by the step size between each reference voltage and the number of comparators. In order to keep the circuit complexity to a reasonable level, an exemplary implementation may include sixteen comparators. The step size of the circuit should be kept low enough (e.g., 5 mV) by selecting appropriate values of the resistors to provide enough resolution in the feedback loop. The step size directly relates to the output voltage static regulation and also the noise added to the output voltage due to the quantization of the error signal. With sixteen comparators and a 5 mV step size, the overall window is only ±40 mV. In the event of a sudden and large current change on the output of the power supply 10 (e.g., due to load current changes), the dynamic voltage excursion can easily exceed 40 mV. In that case, the ADC 40 saturates and the voltage error signal $VEd_k$ is no longer linear, i.e., it is not proportional to the actual error. As discussed above, the output terminal of comparator 46D provides a HIGH saturation signal to reflect this saturation condition.

Figure 4:
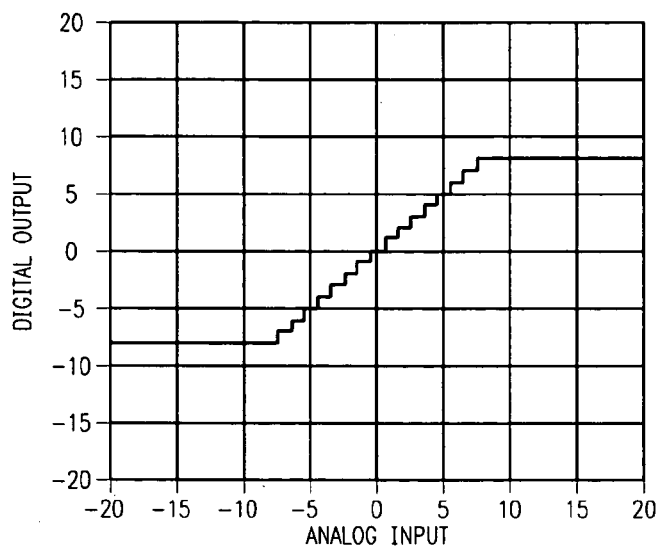
FIG. 4 is a graph depicting a linear ADC transfer function.

FIG. 4 illustrates a graph depicting a linear ADC transfer function in accordance with a conventional windowed flash ADC. The horizontal dimension of the graph reflects the analog error signals input to the logic device 52 and the vertical dimension reflects the digital output from the logic device. As shown, there is a linear relationship between the input analog error signal and the digital output of the ADC within the conversion window due to selection of resistors having uniform values that provide equal voltage increments and the mapping of the digital output values to the input error signal in uniform increments. As a result, the practical window size of the ADC is fairly limited which has certain disadvantages. Namely, it makes the feedback system non-linear during large and sudden load changes, which tends to make it difficult to guarantee stability in such conditions. In addition, when the correction to the output due to saturation changes so much that it falls immediately into the opposite saturation, the circuit can become unstable and produce a limit cycle oscillation between the ADC window boundaries.

Figure 5:
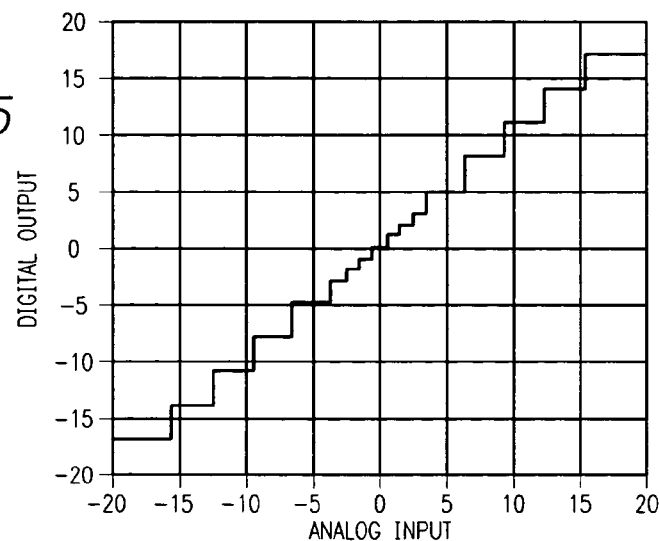
FIG. 5 is a graph depicting a linear ADC transfer function with an increased step size at the window boundaries in accordance with an embodiment of the invention.

FIG. 5 illustrates a graph depicting an ADC transfer function in which the step size is changed in accordance with an embodiment of the invention. As in FIG. 4, the horizontal dimension of the graph reflects the analog error signals input to the logic device 52 and the vertical dimension reflects the digital output of the logic device. The step size is increased in the region adjacent to the boundary of the ADC window by using different resistor values in the boundary regions. In addition, the logic device 52 is changed such that the "temperature" code out of the comparators is mapped into a digital number matching the increased step size at the boundary of the window. This keeps the overall transfer function of the ADC linear. While the window is enlarged overall, the gain is substantially unaffected. The decreased resolution at the ADC boundary regions is acceptable since the steady state voltage of the ADC will always be around zero error (assuming a controller transfer function with a pole at zero). At zero error, the resolution is the same as with the previous embodiment and therefore stability and output voltage precision is unaffected. The larger step size of the ADC only affects the circuit during large dynamic changes, i.e., step increases or decreases in load current). Since this is a dynamic process, the precision of the regulation is not important, but by providing a gain number proportional to the actual error the overall stability of the circuit is improved.

The embodiment of FIG. 5 illustrates the use of two different step sizes, i.e., a first step size in the center of the ADC window and a second, larger step size in the peripheral region of the window. It should be appreciated that there may alternatively be a plurality of intermediary gradations of step size ranging from the first step size in the center of the ADC window to the second step size at the periphery. Each of these gradations of step size would nevertheless be mapped into digital numbers matching the corresponding step size to keep the overall transfer function of the ADC linear.

Figure 6:
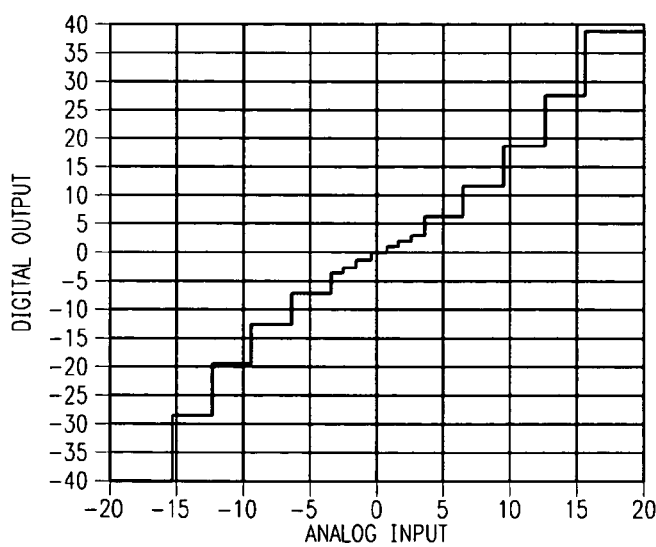
FIG. 6 is a graph depicting a non-linear ADC transfer function with increased step size and increased gain at the window boundaries in accordance with another embodiment of the invention.

While the ADC transfer function of FIG. 5 increases the ADC window size to improve stability robustness and provides a linear relationship between ADC input and output over a larger window size, it does not provide faster settling time during transient regulation conditions. In the embodiment of FIG. 6, the transfer function is further modified to increase the step size at the window boundary as in the preceding embodiment, and also the transfer function is made non-linear toward the window boundary so that the error reported to the controller 36 is larger than the actual value. In the center of the window, the step size and mapping to the digital number is as in the preceding embodiments. But, at the peripheral region of the window, the magnitude of the digital output is increased out of proportion with the step increases of the analog input. The non-linear mapping in the peripheral region of the window helps to speed up the feedback loop for large dynamic errors without altering the small signal stability in steady state conditions. As in the preceding embodiment, the horizontal dimension of the graph reflects the analog error input to the logic circuit 52 and the vertical dimension reflects the digital output of the logic circuit. It should be appreciated that there may be a plurality of gradations of step size and mapping to the digital numbers at the periphery of the ADC window.

Returning now to FIG. 3, a digital controller having a digital filter and ADC 62 is depicted. The digital filter further comprises an infinite impulse response (IIR) filter that produces an output $PWM'_k$ from previous voltage error inputs $VEd_k$ and previous outputs $PWM'_k$. As discussed above, ADC 40 provides the voltage error inputs $VEd_k$. The digital filter outputs $PWM'_k$ are provided to the digital pulse width modulator (DPWM) 36, which provides the pulse width modulated control signal ($PWM_k$) to the power supply power switches.

Figure 3:
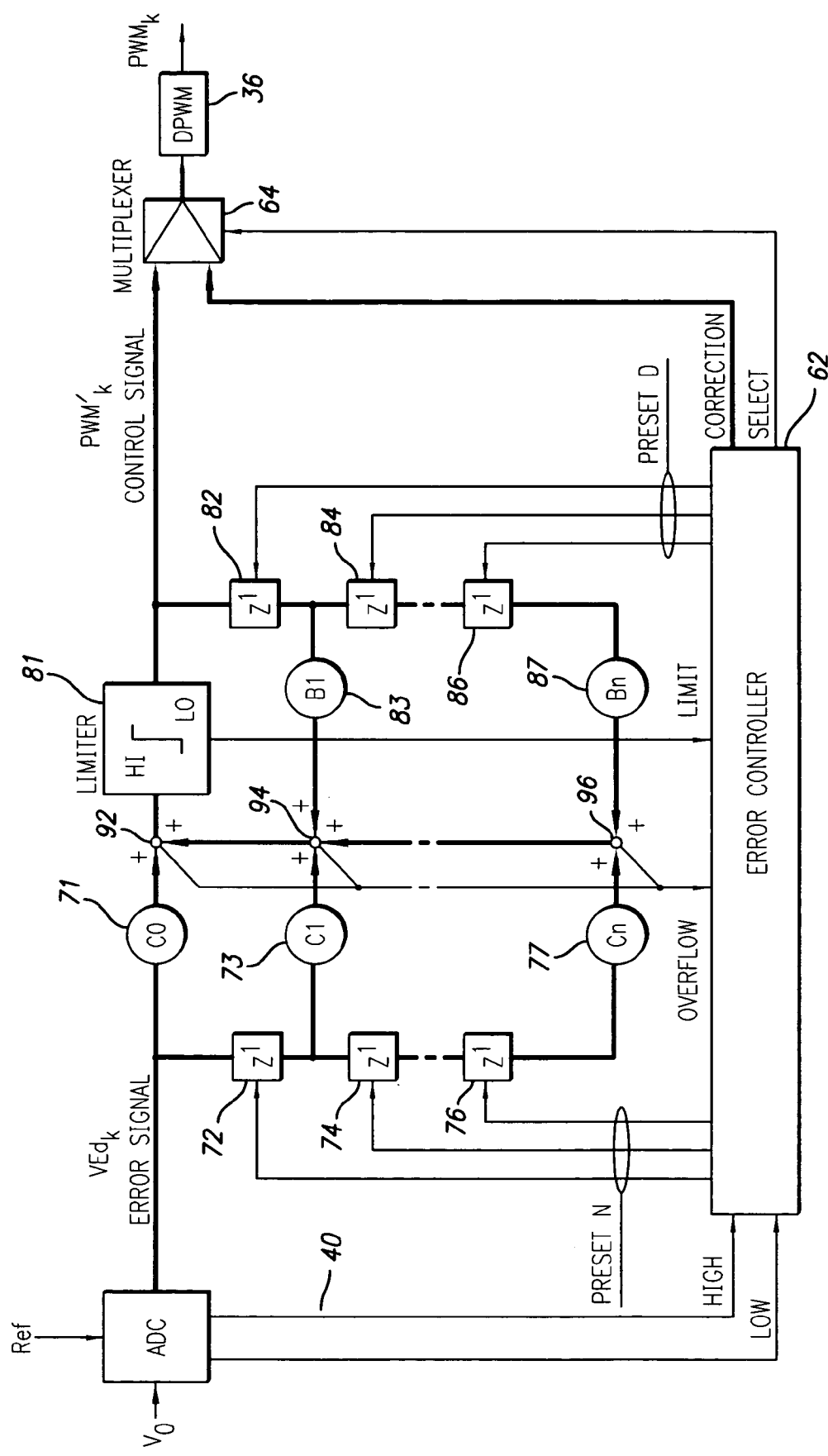
FIG. 3 depicts a digital controller having an infinite impulse response filter and error controller.

The IIR filter is illustrated in block diagram form and includes a first plurality of delay registers 72, 74, . . . , 76 (each labeled $z^{-1}$), a first plurality of mathematical operators (multipliers) with coefficients 71, 73, . . . , 77 (labeled C0, C1, . . . , Cn), a second plurality of mathematical operators (adders) 92, 94, 96, a second plurality of delay registers 82, 84, . . . , 86 (each labeled $z^{-1}$), and a third plurality of mathematical operators (multipliers) with coefficients 83, 87 (labeled B1, . . . , Bn). Each of the first delay registers 72, 74, 76 holds a previous sample of the voltage error $VEd_k$ which is then weighted by a respective one of the coefficients 71, 73, 77. Likewise, each of the second delay registers 82, 84, 86 holds a previous sample of the output $PWM'_k$, which is then weighted by a respective one of the coefficients 83, 87. The adders 92, 94, and 96 combine the weighted input and output samples. It should be appreciated that a greater number of delay registers and coefficients may be included in the IIR filter, and that a limited number is shown in FIG. 3 for exemplary purposes only. The digital filter structure shown in FIG. 3 is an exemplary implementation of the following transfer function G(z):

$$G(z) = \frac{PWM(z)}{VEd(z)} = \frac{C_0 + C_1 \cdot z^{-1} + C_2 \cdot z^{-2} + \ldots + C_n \cdot z^{-n}}{1 - B_1 \cdot z^{-1} - B_2 \cdot z^{-2} - \ldots - B_n \cdot z^{-n}}$$

The error controller 62 receives a plurality of input signals reflecting error conditions of the ADC 40 and the digital filter. Specifically, the error controller 62 receives the HIGH and LOW saturation signals from the ADC 40 reflecting that the output voltage $V_o$ is above and below the voltage window of the ADC, respectively. Each of the mathematical operators (adders) 92, 94, 96 provides an overflow signal to the error controller 62 reflecting an overflow condition (i.e., carry bit) of the mathematical operators. The digital filter further includes a range limiter 81 that clips the output $PWM'_k$ if upper or lower range limits are reached. In that situation, the range limiter 81 provides the error controller 62 with a corresponding limit signal.

The error controller 62 uses these input signals to alter the operation of the digital filter in order to improve the responsiveness of the digital filter to changing load conditions. The error controller 62 is coupled to each of the first plurality of delay registers 72, 74, 76 and second plurality of delay registers 82, 84, 86 to enable the resetting and/or presetting of the value stored therein. As used herein, "resetting" refers to the setting of the value to an initial value (e.g., zero), whereas "presetting" refers to the setting of the value to another predetermined number. Particularly, the error controller 62 can replace the previous samples of the voltage error $VEd_k$ and output $PWM'_k$ with predetermined values that change the behavior of the power supply. The digital controller further includes multiplexer 64 that enables selection between the $PWM'_k$ output signal and a predetermined output signal provided by the error controller 62. A select signal provided by the error controller 62 determines which signal passes through the multiplexer 64. When the ADC 40 goes into HIGH or LOW saturation, the error controller 62 sets the $PWM'_k$ signal to a specific predetermined value (or sequence of values that are dependent in part on the previous samples) by controlling the multiplexer 64. In order to recover smoothly from such a condition, the error controller can also alter the delayed input and output samples by reloading the first plurality of delay registers 72, 74, 76, and second plurality of delay registers 82, 84, 86. This will assure a controlled behavior of the feedback loop as the ADC 40 recovers from saturation.

By way of example, if the ADC 40 experiences a positive saturation, i.e., the LOW signal changing from a low state to a high state, the $PWM'_k$ sample can be reset to zero to help to reduce the error. By resetting the $PWM'_k$ sample to zero, the pulse width delivered to the high side power switch 12 of the power supply 10 goes to zero, effectively shutting off power to the resistive load 20 (see FIG. 1). In order to recover from this situation smoothly, the samples $PWM'_{k-1}$, $PWM'_{k-2}$, . . . , $PWM'_{k-n}$ can also be reset to zero or preset to another value in order to allow a smooth recovery. Likewise, if the ADC 40 experiences a negative saturation, i.e., the HIGH signal changing from a low state to a high state, the PWM'$_k$ sample can be preset to a maximum value to increase the pulse width delivered to the high side power switch 12 to reduce the error. Also, when an internal numeric overflow of the digital filter occurs, the error controller 62 can take actions to prevent uncontrolled command of the power switches of the power supply, such as altering the input and output samples of the digital filters.

Having thus described a preferred embodiment of a method for digitally controlling a switched mode power supply, it should be apparent to those skilled in the art that certain advantages of the system have been achieved. It should also be appreciated that various modifications, adaptations, and alternative embodiments thereof may be made within the scope and spirit of the present invention. The invention is further defined by the following claims.

What is claimed is:

1. A switched mode power supply comprising:
   at least one power switch adapted to convey power between input and output terminals of said power supply; and
   a digital controller adapted to control operation of said at least one power switch responsive to an output measurement of said power supply, said digital controller comprising:
      an analog-to-digital converter providing a digital error signal representing a voltage difference between said output measurement and a reference value, said analog-to-digital converter further comprises a windowed flash analog-to-digital converter having a transfer function defining a relationship between said voltage difference and corresponding digital values, said transfer function having a substantially linear region at a center of a corresponding error window, said transfer function further comprises a first step size in said center of said error window and at least one additional step size in a peripheral region of said error window, each said at least one additional step size being larger than said first step size;
      a digital filter providing a digital control output based on a sum of current and previous error signals and previous control outputs; and
      a digital pulse width modulator providing a control signal to said at least one power switch, said control signal having a pulse width corresponding to said digital control output.

2. The power supply of claim 1, wherein said first step size and said at least one additional step size each reflect a linear relationship between said voltage difference and said corresponding digital values.

3. The power supply of claim 1, wherein said first step size reflects a linear relationship between said voltage difference and said corresponding digital values, and said at least one additional step size reflects a non-linear relationship between said voltage difference and said corresponding digital values.

4. The power supply of claim 1, wherein said windowed flash analog-to-digital converter provides a HIGH signal reflecting a negative saturation of said analog-to-digital converter and a LOW signal reflecting a positive saturation of said analog-to-digital converter.

5. The power supply of claim 1, wherein said digital filter further comprises an infinite impulse response filter.

6. The power supply of claim 5, wherein said infinite impulse response filter provides the following transfer function G(z):

$$G(z) = \frac{PWM(z)}{VEd(z)} = \frac{C_0 + C_1 \cdot z^{-1} + C_2 \cdot z^{-2} + \ldots + C_n \cdot z^{-n}}{1 - B_1 \cdot z^{-1} - B_2 \cdot z^{-2} - \ldots - B_n \cdot z^{-n}}$$

wherein PWM(z) is the digital control output, VEd(z) is the error signal, $C_0 \ldots C_n$ are input side coefficients, and $B_1 \ldots B_n$ are output side coefficients.

7. The power supply of claim 1, wherein said digital filter further comprises a range limiter adapted to clip said digital control output if upper or lower range limits are reached.

8. The power supply of claim 7, wherein said range limiter provides a limit signal to said error controller if said upper or lower range limits are reached.

9. The power supply of claim 1, wherein said digital controller further comprises a multiplexer coupled to said error controller and to said digital filter, said error controller providing an alternative digital control output to said multiplexer that passes to said digital pulse width modulator upon said error condition.

10. The power supply of claim 1, further comprising an error controller adapted to modify operation of said digital filter upon an error condition.

11. The power supply of claim 10, wherein said error controller is further adapted to preset at least one of said previous error signals with predetermined values upon said error condition.

12. The power supply of claim 10, wherein said error controller is further adapted to preset at least one of said previous control outputs with predetermined values upon said error condition.

13. The power supply of claim 10, wherein said error controller is further adapted to reset at least one of said previous error signals to initial values upon said error condition.

14. The power supply of claim 10, wherein said error controller is further adapted to reset at least one of said previous control outputs to initial values upon said error condition.

15. The power supply of claim 10, wherein said error condition further comprises a saturation of said analog-to-digital converter.

16. The power supply of claim 10, wherein said error condition further comprises a mathematical overflow of said digital filter.

17. A method of controlling a switched mode power supply comprising at least one power switch adapted to convey power between input and output terminals of said power supply, said method comprising:
   receiving an output measurement of said power supply;
   sampling said output measurement to provide a digital error signal representing a voltage difference between said output measurement and a reference value in accordance with a transfer function defining a relationship between said voltage difference and corresponding digital values, said transfer function having a substantially linear region at a center of a corresponding error window, said transfer function further comprising a first step size in said center of said error window and at least one other step size in a peripheral region of said error window, each said at least one other step size being larger than said first step size;
   filtering said digital error signal to provide a digital control output based on a sum of current and previous error signals and previous control outputs; and providing a control signal to said at least one power switch, said control signal having a pulse width corresponding to said digital control output.

18. The method of claim 17, wherein said sampling step further comprises providing a HIGH signal reflecting a negative saturation state and a LOW signal reflecting a positive saturation state.

19. The method of claim 17, wherein filtering step further comprises filtering said digital error signal using an infinite impulse response filter.

20. The method of claim 17, wherein said filtering step further comprises filtering said digital error signal in accordance with the following transfer function G(z):

$$G(z) = \frac{PWM(z)}{VEd(z)} = \frac{C_0 + C_1 \cdot z^{-1} + C_2 \cdot z^{-2} + \ldots + C_n \cdot z^{-n}}{1 - B_1 \cdot z^{-1} - B_2 \cdot z^{-2} - \ldots - B_n \cdot z^{-n}}$$

wherein PWM(z) is the digital control output, VEd(z) is the error signal, $C_0 \ldots C_n$ are input side coefficients, and $B_1 \ldots B_n$ are output side coefficients.

21. The method of claim 17, wherein said filtering step further comprises clipping said digital control output if upper or lower range limits are reached.

22. The method of claim 21, wherein said filtering step further comprises providing a limit signal indicating that said upper or lower range limit is reached.

23. The method of claim 17, further comprising providing an alternative digital control output upon said error condition.

24. The method of claim 17, wherein said first step size and said at least one other step size each reflect a linear relationship between said voltage difference and said corresponding digital values.

25. The method of claim 17, wherein said first step size reflects a linear relationship between said voltage difference and said corresponding digital values, and said at least one other step size reflects a non-linear relationship between said voltage difference and said corresponding digital values.

* * * * *